United States Patent
Inaba

(10) Patent No.: US 7,690,213 B2
(45) Date of Patent: Apr. 6, 2010

(54) WASTE HEAT UTILIZATION DEVICE AND CONTROL METHOD THEREOF

(75) Inventor: Atsushi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 486 days.

(21) Appl. No.: 11/709,276

(22) Filed: Feb. 22, 2007

(65) Prior Publication Data

US 2007/0214817 A1    Sep. 20, 2007

(30) Foreign Application Priority Data

Feb. 24, 2006    (JP)    ............................. 2006-049291

(51) Int. Cl.
*F25B 27/02*    (2006.01)

(52) U.S. Cl. .................................................. 62/238.6

(58) Field of Classification Search ................ 62/238.6, 62/238, 7, 238.7
See application file for complete search history.

(56) References Cited

U.S. PATENT DOCUMENTS 7,418,824 B2 * 9/2008 Uno et al. ................... 62/238.6
2005/0235670 A1   10/2005 Takeuchi et al.
2005/0262858 A1 * 12/2005 Inaba et al. .................. 62/190
2006/0026981 A1    2/2006 Inaba et al.
2006/0080985 A1 *  4/2006 Inaba et al. ................ 62/238.6

* cited by examiner

*Primary Examiner*—William E Tapolcai
(74) *Attorney, Agent, or Firm*—Posz Law Group, PLC

(57) ABSTRACT

A waste heat utilization device includes a refrigeration cycle having a compressor, a Rankine cycle using a condenser in common with the refrigeration cycle, and a control unit which controls operation of the refrigeration cycle and the Rankine cycle. The control unit performs a continuation control of the Rankine cycle, in which the Rankine cycle is continuously operated regardless of an operation state of the compressor, when a load of the refrigeration cycle is lower than a predetermined load. In contrast, the control unit performs an intermittent control of the Rankine cycle, in which the Rankine cycle is intermittently operated in accordance with the operation state of the compressor such that the mechanical energy recovered by the expansion unit is larger than a driving energy of the compressor.

26 Claims, 6 Drawing Sheets

WASTE HEAT UTILIZATION DEVICE AND CONTROL METHOD THEREOF

CROSS REFERENCE TO RELATED APPLICATION

This application is based on Japanese Patent Application No. 2006-049291 filed on Feb. 24, 2006, the contents of which are incorporated herein by reference in its entirety.

BACKGROUND OF THE INVENTION

1. Field of the Invention

The present invention relates to a waste heat utilization device and a control method thereof. For example, the waste heat utilization device recovers power by using waste heat of a heat generating unit, and can be suitably used for a vehicle having an internal combustion engine.

2. Description of the Related Art

A waste heat utilization device is described in JP-A-2005-307951 (corresponding to US 2005/0235670 A1), for example. The waste heat utilization device includes a refrigeration cycle for air-conditioning, and a Rankine cycle that recovers waste heat from a heat generating unit such as an internal combustion engine. The refrigeration cycle includes a compressor that is driven by power of the engine to compress and discharge refrigerant, and the Rankine cycle includes an expansion unit that is operated by expansion of the refrigerant heated by the waste heat. The waste heat is generated from the heat generating unit and is obtained during a cooling operation of the heat generating unit. Furthermore, the Rankine cycle is constructed to use a condenser (radiator) in common with the refrigeration cycle.

Furthermore, a stand-along operation (single operation) of the refrigeration cycle, a stand-along operation (single operation) of the Rankine cycle and a simultaneous operation (combination operation) of the refrigeration cycle and the Rankine cycle are selectively performed in accordance with an air-conditioning necessity, a heat recovering possibility of the waste heat, etc.

However, in a case where cooling load is large in the refrigeration cycle in the summer season, when the refrigeration cycle and the Rankine cycle are simultaneously operated in the waste heat utilization device, energy loss may be caused in the whole cycle of the waste heat utilization device even when waste heat is recovered in the Rankine cycle. The problems will be described in detail as follows based on the experiments performed by the inventors of the present application.

FIG. 12 is a graph showing a relationship between the cooling load of the refrigeration cycle and a driving power of the compressor when only the refrigeration cycle is operated (single operation), and FIG. 13 is a Mollier diagram (p-h diagram) of the refrigeration cycle used in FIG. 12. In FIG. 13, DP is the driving power of the compressor. Next, FIG. 14 is a graph showing a relationship between the cooling load of the refrigeration cycle and the driving power of the compressor when both the refrigeration cycle and the Rankine cycle are simultaneously operated (combination operation), in addition to the single operation of FIG. 12.

As shown in FIG. 14, the driving power of the compressor becomes very high in the combination operation as compared with the single operation of the refrigeration cycle, because heat from the refrigeration cycle and heat from the Rankine cycle are introduced into the common condenser. Thus, in the combination operation of both the refrigeration cycle and the Rankine cycle, the condensation pressure of the condenser becomes higher as compared with the single operation of the refrigeration cycle, as shown in FIG. 15. In FIG. 15, CP indicates the increase of the condensation pressure in the combination operation as compared with the single operation, EO indicates the output power of the expansion unit in the combination operation, and DP1 indicates the power deterioration in the compressor as compared with the single operation.

A compression ratio (i.e., a ratio of the discharge pressure to the suction pressure) of the compressor becomes higher as the condensation pressure CP increases, thereby the driving power of the compressor is increased. FIG. 16 shows the driving energy E1 for driving the compressor and the recovered energy E2 recovered in the Rankine cycle, in accordance with a change of the cooling load, during the combination operation. In FIG. 16, Z indicates the balance point between the driving energy E1 and the recovered energy E2, and the cooling load generally becomes larger as an outside air temperature increases. As shown in FIG. 16, in the combination operation of the waste heat utilization device, even when the energy is recovered in the Rankine cycle, the energy balance between the recovered energy E2 and the driving energy E1 becomes minus when the cooling load is larger than a predetermined value, thereby deteriorating the fuel consumption efficiency in the engine.

SUMMARY OF THE INVENTION

In view of the foregoing problems, it is a first object of the present invention to provide a waste heat utilization device which can control the energy balance to be always plus regardless of the cooling load of a refrigeration cycle in a combination operation where the refrigeration cycle and a Rankine cycle are simultaneously operated.

It is a second object of the present invention to provide a control method for controlling a waste heat utilization device, which can control the energy balance to be always plus regardless of the cooling load of a refrigeration cycle in a combination operation where the refrigeration cycle and a Rankine cycle are simultaneously operated.

According to an aspect of the present invention, a waste heat utilization device includes a refrigeration cycle, a Rankine cycle and a control unit which controls operation of the refrigeration cycle and the Rankine cycle. The refrigeration cycle includes a compressor which draws a low-pressure refrigerant flowing from a side of an evaporator for cooling air, compresses the drawn refrigerant to have a high temperature and high pressure, and discharges the compressed refrigerant toward a condenser in which refrigerant is cooled and condensed. The Rankine cycle uses the condenser in common with the refrigeration cycle, and includes a pump for pumping and sending refrigerant, and an expansion unit which expands refrigerant sent by the pump and heated by waste heat from a heat generating unit so as to recover a mechanical energy.

In the waste heat utilization device, the control unit performs a continuation control of the Rankine cycle, in which the Rankine cycle is continuously operated regardless of an operation state of the compressor, when a load of the refrigeration cycle is lower than a predetermined load. In contrast, the control unit performs an intermittent control of the Rankine cycle, in which the Rankine cycle is intermittently operated in accordance with the operation state of the compressor such that the mechanical energy recovered by the expansion unit is larger than a driving energy of the compressor. Accordingly, in a case where the load of the refrigeration cycle is lower than the predetermined load, because the mechanical energy recovered by the Rankine cycle is larger than the driving energy of the compressor, the energy balance between the recovered mechanical energy and the driving energy of the compressor can be made plus while the Rankine cycle can be continuously operated. As a result, the waste heat of the heat generating unit can be effectively used. Furthermore, in a case where the load of the refrigeration cycle is higher than the predetermined load, by performing the intermittent control of the Rankine cycle, it can prevent the mechanical energy recovered by the expansion unit from being lower than the driving energy of the compressor. As a result, the energy balance between the recovered mechanical energy and the driving energy of the compressor can be made plus, and the waste heat of the heat generating unit can be effectively used.

According to another aspect of the present invention, a control method of a waste heat utilization device includes: a step of performing a continuation control of a Rankine cycle, in which the Rankine cycle is continuously operated regardless of an operation state of a compressor of a refrigeration cycle, when a load of the refrigeration cycle is lower than a predetermined load; and a step of performing an intermittent control of the Rankine cycle, in which the Rankine cycle is intermittently operated in accordance with the operation state of the compressor such that the mechanical energy recovered by an expansion unit is larger than a driving energy of the compressor. Accordingly, regardless of the load of the refrigeration cycle, the energy balance can be made always plus even in a combination operation where both the refrigeration cycle and the Rankine cycle are simultaneously operated, and the waste heat from the heat generating unit can be effectively recovered.

For example, in the waste heat utilization device and the control method thereof, the control unit may perform an intermittent operation of the compressor, in which the compressor is intermittently operated when the intermittent control of the Rankine cycle is performed. In this case, the control unit performs the intermittent control of the Rankine cycle to be reversed in an operation state with the intermittent operation of the compressor. The compressor may be a fixed displacement compressor that is driven by a driving source and has a predetermined discharge capacity per rotation. In this case, the control unit performs the intermittent operation of the compressor by switching a clutch connected with the driving source or turning on or off the driving source. Alternatively, the compressor may be a variable displacement compressor in which the discharge capacity per rotation is adjustable. In this case, the control unit performs the intermittent operation of the compressor by switching the discharge capacity between a first capacity and a second capacity larger than the first capacity.

The load of the refrigeration cycle may be determined by using an outside air temperature, or may be determined by combining information for controlling the heat generating unit and information for controlling the refrigeration cycle. Furthermore, the information for controlling the heat generating unit may be at least one of a vehicle speed, a rotation speed of an internal combustion engine used as the heat generating unit, an outside air temperature, a coolant temperature of the internal combustion engine. The information for controlling the refrigeration cycle may be at least one of an interior temperature of a compartment to be air-conditioned, a target air temperature to be blown into the compartment, an air temperature cooled by the evaporator, a refrigerant pressure in the refrigeration cycle. Alternatively, the load of the refrigeration cycle may be determined by using an information for controlling the refrigeration cycle, which includes at least one of an interior temperature of a compartment to be air-conditioned, an outside air temperature, a target air temperature to be blown into the compartment, an air temperature cooled by the evaporator, a refrigerant pressure in the refrigeration cycle.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
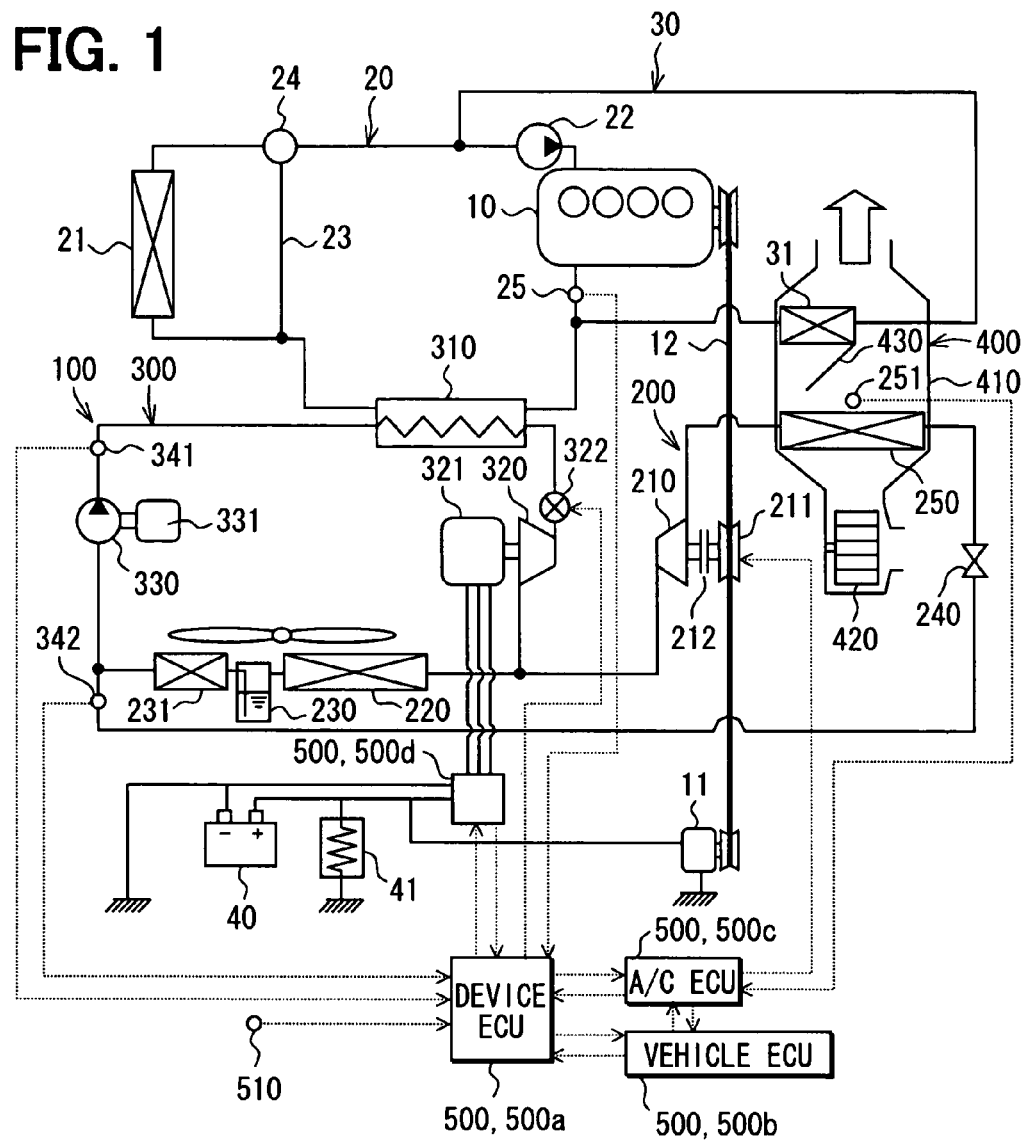
FIG. 1 is a schematic diagram showing a structure of a waste heat utilization device according to a first embodiment of the present invention.

A first embodiment of the present invention will be now described with reference to FIGS. 1 to 5. In this embodiment, a waste heat utilization device 100 (cycle system) is typically used for a vehicle using an internal combustion engine 10 as a vehicle driving source. The waste heat utilization device 100 is constructed with a refrigeration cycle 200, a Rankine cycle 300 having a generator 321, and a control unit 500 (500a, 500b, 500c, 500d) for controlling operation of the refrigeration cycle 200 and the Rankine cycle 300. A part of components of the refrigeration cycle 200 is used in common with the Rankine cycle 300.

The engine 10 is a water-cooled internal combustion engine, and is an example of a heat generating unit in this embodiment. As shown in FIG. 1, a radiator circuit 20 and a heater circuit 30 are provided for the engine 10. The Engine 10 is cooled by engine-cooling water circulating in the radiator circuit 20, and air-conditioning air is heated using the engine-cooling water (hot water) as a heat source in the heater circuit 30. The engine 10 is provided with an alternator 11 which is driven by the driving power of the engine 10 through a belt 12 so as to generate electrical power. The electrical power generated by the alternator 11 is charged in a battery 40, and is supplied to a vehicle electrical load 41 (e.g., head lamp, wiper, audio).

The radiator circuit 20 is provided with a radiator 21 that cools the engine-cooling water circulated by a water pump 22 by performing heat exchange with outside air. For example, the water pump 22 is a mechanical pump driven by the engine 10 to be operated by a predetermined rotational ratio, with respect to a rotational speed of the engine 10. Alternatively, the water pump 22 may be an electrical pump driven by an electrical motor, instead of the mechanical pump.

A water temperature sensor 25 for detecting a water temperature is located in a water outlet passage of the engine 10, between a water outlet of the engine 10 and the radiator 21. A heater 310 of the Rankine cycle 300 is also located in the water outlet passage of the engine 10 in the radiator circuit 20, between the water outlet of the engine 10 and the radiator 21. A temperature signal detected by the water temperature sensor 25 is output to a device ECU 500a of the control unit 500. The engine-cooling water flowing out of the engine 10 flows through the heater 310 to perform heat exchange with refrigerant so as to heat the refrigerant.

The radiator circuit 20 is provided with a radiator bypass path 23 through which the engine-cooling water bypasses the radiator 21, and a thermostat 24 is located to adjust a flow amount of cooling water flowing through the radiator 21 and a flow amount of cooling water flowing through the radiator bypass path 23.

The heater circuit 30 is provided with a heater core 31 such that engine-cooling water (hot water) is circulated in the heater circuit 30 by the hot-water pump 22. The heater core 31 is located in an air conditioning case 410 of an air conditioning unit 400 to heat air blown by a blower 420 by using engine-cooling water (hot water) as a heating source. An air mixing door 430 is located in the air conditioning case 410 to adjust a flow amount of air passing through the heater core 31 and a flow amount of air bypassing the heater core 31.

The refrigeration cycle 200 includes a compressor 210, a condenser (refrigerant radiator) 220, a gas-liquid separator 230, a refrigerant super-cooling unit 231, an expansion valve 240, and an evaporator 250 which are connected in this order to form a closed refrigerant cycle.

The compressor 210 is a fluid machine for compressing refrigerant to have a high-pressure and high-temperature in the refrigeration cycle 200. In this embodiment, the compressor 210 is a fixed displacement compressor in which a discharge refrigerant capacity (displacement) per rotation is a predetermined amount, and is driven by a driving power of the engine 10. For example, a pulley 211 is fixed to a driving shaft of the compressor 210. In this case, the compressor 210 is driven by transmitting the driving power of the engine 10 to the pulley 12 through the belt 12. The pulley 211 is provided with an electromagnetic clutch 212 so as to connect or disconnect between the compressor 210 and the pulley 211. By an intermittence (connection/disconnection) control of the electromagnetic clutch 212, the operation (ON/OFF operation) of the compressor 210 is controlled. The intermittence control of the electromagnetic clutch 212 is performed by an air-conditioning ECU 500c of the control unit 500.

The condenser 220 is a heat exchanger for cooling and condensing refrigerant by performing heat exchange with outside air, and is located at a front side in an engine compartment of the vehicle. The condenser 220 is mounted in a vehicle at a front part such that the wind (outside air) during a vehicle running flows into a heat exchanging part of the condenser 220. Therefore, a flow amount of the outside air passing through the condenser 220 is increased in accordance with a vehicle running speed. The gas-liquid separator 230 is a receiver for separating refrigerant condensed in the condenser 220 into gas refrigerant and liquid refrigerant. The super-cooling unit 231 is a heat exchanger for further cooling the liquid refrigerant flowing out of the gas-liquid separator 230. For example, the condenser 220, the gas-liquid separator 230 and the super-cooling unit 231 can be constructed to form a condenser unit with a gas-liquid separation function. Furthermore, the condenser 220, the gas-liquid separator 230 and the super-cooling unit 231 can be integrated to form an integrated condenser unit with the gas-liquid separation function.

The expansion valve 240 is a decompression unit for decompressing and expanding liquid refrigerant flowing out of the super-cooling unit 231. In this embodiment, the expansion valve 240 decompresses liquid refrigerant flowing out of the super-cooling unit 231 in iso-enthalpy, and the expansion valve 240 is a thermal expansion valve having a throttle open degree that is controlled such that a super-heating degree of the refrigerant drawn into the compressor 210 becomes a predetermined value.

The evaporator 250 is located in the air conditioning case 410 of the air conditioning unit 400 at an upstream air side of the heater core 31. The evaporator 250 evaporates the refrigerant decompressed by the expansion valve 240 and cools air blown by the blower 420. A refrigerant outlet side of the evaporator 250 is connected to a refrigerant suction side of the compressor 210 so that the refrigerant evaporated in the evaporator 250 is drawn into the refrigerant suction side of the compressor 210.

A temperature sensor 251 is located at a downstream air side of the evaporator 250 so as to detect the temperature of air cooled by the evaporator 250. A temperature signal detected by the temperature sensor 251 is output to an air conditioning ECU (A/C ECU) 500c of the control unit 500. An open degree of the air mixing door 430 is controlled by the air conditioning ECU 500c to control a flow ratio between an air amount passing through the heater core 31 and an air amount bypassing the heater core 31, so that conditioned air flowing into a passenger compartment is approached to a set temperature of the passenger compartment.

Next, the Rankine cycle 300 will be described. The Rankine cycle 300 recovers waste energy (engine-cooling water heat energy) generated in the engine 10. The Rankine cycle 300 converts the waste energy to electrical energy to be used. The Rankine cycle 300 uses a part of components of the refrigeration cycle 200, such as the condenser 220, the gas-liquid separator 230 and the super-cooling unit 231, in common with the refrigeration cycle 200.

In this embodiment, the Rankine cycle 300 is a closed cycle in which the pump 330, the heater 310, the expansion unit 320, the condenser 220, the gas-liquid separator 230 and the super-cooling unit 231 are connected in this order. Because the condenser 220, the gas-liquid separator 230 and the super-cooling unit 231 are used in common between the refrigeration cycle 200 and the Rankine cycle 300, operation fluid circulating in the Rankine cycle 300 is the same refrigerant as that in the refrigeration cycle 200.

The pump 330 is a fluid machine for circulating refrigerant in the Rankine cycle 300, and is operated by a driving power of an electrical motor 331 (actuator). The operation of the electrical motor 331 is controlled by an inverter 500d of the control unit 500.

The heater 310 is a heat exchanger, in which refrigerant sent by the pump 330 is heat-exchanged with high-temperature engine-cooling water circulating in the radiator circuit 20 so as to be super-heated vapor refrigerant having a high-pressure and high-temperature.

The expansion unit 320 is a fluid machine, which generates a rotation driving power (mechanical energy) due to expansion of super-heated vapor refrigerant that is heated in and generated by the heater 310. In the Rankine cycle 300, the generator 321 is connected to the expansion unit 320. For example, the generator 321 can be formed integrally with the expansion unit 320.

The generator 321 is operated and controlled by the inverter 500d of the control unit 500. When the driving power from the expansion unit 320 is transmitted to the generator 321, the rotation speed of the generator 321 is controlled by the inverter 500d so that the electrical power generated from the generator 321 is adjusted. The electrical power generated by the generator 321 is charged in the battery 40 through the inverter 500d.

A refrigerant discharge side of the expansion unit 320 is connected to a refrigerant path to be joined with the condenser 220 and to be branched from the refrigeration cycle at a refrigerant outlet side of the super-cooling unit 231 in the Rankine cycle, as shown in FIG. 1.

The Rankine cycle 300 is provided with a switching unit 322 for switching a refrigerant path at a refrigerant inlet side of the expansion unit 320 in the Rankine cycle 300. The switching unit 322 is an expansion switching valve 322 located to open and close a refrigerant inlet path at the refrigerant inlet side of the expansion unit 320. The expansion switching valve 322 is constructed with an electromagnetic valve, and is opened and closed by the device control ECU 500a of the control unit 500.

A refrigerant pressure sensor 341 as a pressure detecting unit is located between the pump 330 and the heater 310 so as to detect a refrigerant pressure on a high-pressure side of the Rankine cycle 300. A pressure signal detected by the refrigerant pressure sensor 341 is output to the device ECU 500a of the control unit 500.

A refrigerant pressure sensor 342 for detecting a high-pressure side refrigerant pressure before being decompressed is located in the refrigeration cycle 200 between the super-cooling unit 231 and the expansion valve 240. A pressure signal detected by the refrigerant pressure sensor 342 is output to the device ECU 500a of the control unit 500.

The control unit 500 controls operation of various components of the refrigeration cycle 200 and the Rankine cycle 300. The control unit 500 includes the device ECU 500a, the vehicle ECU 500b, the air-conditioning ECU 500c and the inverter 500d, which are communicated with each other as shown in FIG. 1. The device ECU 500a is communicated with the vehicle ECU 500b, the air-conditioning ECU 500c and the inverter 500d to send and receive signals therebetween.

An outside air temperature sensor 510 for detecting a temperature T(AM) of outside air (i.e., air outside the passenger compartment) is located, such that a detected temperature signal of the outside air temperature sensor 510 is input to the device ECU 500a.

The device ECU 500a performs a total control of the refrigeration cycle 200 and the Rankine cycle 300. For example, in the combination operation (simultaneous operation) of the refrigeration cycle 200 and the Rankine cycle 300, the operation of the Rankine cycle 300 is controlled by the device ECU 500a through the inverter 500d such that a balance (i.e., difference) between a recovered energy of the Rankine cycle 300 and a driving energy of the compressor 210 becomes plus regardless of a variation in the cooling load of the refrigeration cycle 200.

The vehicle ECU 500b controls mainly the operation of the engine 10. The vehicle ECU 500b controls a fuel injection amount (fuel supply amount) based on a water temperature detected by the water temperature sensor 25, an engine rotational speed, and an engine load (engine torque) calculated by an open degree of a throttle valve, etc., such that the consumption efficiency of fuel (gasoline) becomes maximum. The vehicle ECU 500b can calculate the engine rotational speed, a vehicle running speed, etc. The vehicle running speed can be calculated by the vehicle ECU 500b based on a transmission gear position, for example.

The air-conditioning ECU 500c generally controls operation of the refrigeration cycle 200 based on an air-conditioning request of a passenger in the passenger compartment of the vehicle, a set temperature of the passenger compartment, an actual inside temperature of the passenger compartment, an air temperature cooled by the evaporator 250, and environmental condition (e.g., outside air temperature, solar radiation amount). The inverter 500d is constructed to operate the generator 321 and the electrical motor 331 (actuator) and to control rotation speeds of the generator 321 and the electrical motor 331 (actuator), thereby controlling the operation of the Rankine cycle 300.

Next, operation of the waste heat utilization device 100 will be described. The waste heat utilization device 100 is constructed to perform a single operation (i.e., stand-along operation) of the refrigeration cycle 200, a single operation (i.e., stand-along operation) of the Rankine cycle 300, and a combination operation (i.e., simultaneous operation) of both the refrigeration cycle 200 and the Rankine cycle 300.

1. Single Operation of Refrigeration Cycle

At an engine-heating mode immediately after a start of the engine 10, waste heat from the engine 10 is small, and a water temperature detected by the water temperature sensor 25 is lower than a predetermined water temperature. In this case, when the control unit 500 determines an air conditioning request from a passenger in the passenger compartment, the generator 321 and the electrical motor 331 are stopped to stop the expansion unit 320 and the pump 330, thereby performing the single operation of the refrigeration cycle 200.

The control unit 500 (air-conditioning ECU 500c) calculates a target air temperature based on an actual inside temperature of the passenger compartment, an actual outside air temperature and a solar radiation amount entering in the passenger compartment, so that the actual inside temperature of the passenger compartment becomes the set temperature in the operation of the refrigeration cycle 200. Furthermore, the operation of the compressor 210 is controlled so that an air temperature flowing out of the evaporator 250 becomes in a range (e.g., 3-4° C.), and the open degree of the air mixing door 430 are controlled, based on the calculated target air temperature.

Figure 2:
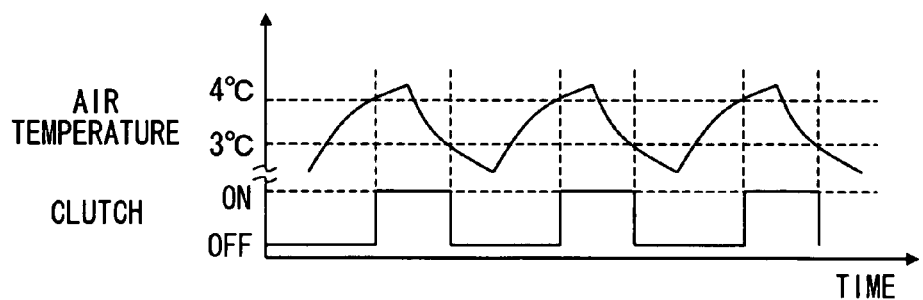
FIG. 2 is a time chard showing a relationship between ON/OFF operation of an electromagnetic clutch and a cooling air temperature in a refrigeration cycle control, according to the first embodiment.

The operation of the compressor 210 is controlled by the electromagnetic clutch 212. For example, as shown in FIG. 2, the control unit 500 controls the electromagnetic clutch 212 to be connected (turned ON) so that the compressor 210 is operated (ON) when the cooled air temperature detected by the temperature sensor 251 becomes higher than a first predetermined temperature (e.g., upper limit value 4° C.). In contrast, when the cooled air temperature detected by the temperature sensor 251 becomes lower than a second predetermined temperature (e.g., lower limit value 3° C.) that is lower than the first predetermined temperature, the electromagnetic clutch 212 is disconnected (OFF) so that the operation of the compressor 210 is stopped (OFF). That is, an ON/OFF switch control of the electromagnetic clutch 212 is performed so that the air temperature cooled by the evaporator 250 becomes in a predetermined range.

2. Single Operation of Rankine Cycle

In a case where the control unit 500 does not receive an air-conditioning request, when the water temperature detected by the water temperature sensor 25 is higher than a predetermined temperature, the control unit 500 determines that the waste heat of the engine 10 is sufficiently large, and performs the single operation of the Rankine cycle 300. In this case, the control unit 500 disconnects the electromagnetic clutch 212 to stop the operation of the compressor 210, operates the electrical motor 331 to start the pumping operation of the pump 330, and opens the expansion switching valve 322, thereby singly operating the Rankine cycle 300. Furthermore, electrical power is generated in the generator 321 in accordance with the rotation driving force of the expansion unit 320.

Specifically, liquid refrigerant from the super-cooling unit 231 is pressurized by the pump 330, and is sent to the heater 310 to be heated by high-temperature engine-cooling water. The super-heated high-pressure gas refrigerant from a refrigerant outlet of the heater 310 flows through the expansion switching valve 322, and is sent to the expansion unit 320. The expansion unit 320 expands and decompresses the super-heated gas refrigerant in iso-enthalpy so that a part of the heat energy and the pressure energy is converted to the rotational driving power (mechanical energy). The generator 321 is operated by the rotational driving power from the expansion unit 320 to generate electrical power. The electrical power obtained by the generator 321 is charged in the battery 40 through the inverter 500d. For example, the electrical power charged in the battery 40 is used for operating the electrical load 41 of the vehicle. Thus, it is possible to reduce the load of the alternator 11.

The refrigerant decompressed in the expansion unit 320 is cooled and condensed in the condenser 220, is gas-liquid separated in the gas-liquid separator 230, is super-cooled by the super-cooling unit 231, and is drawn into the pump 330, so that the single operation of the Rankine cycle 300 is performed.

3. Combination Operation of Refrigeration Cycle and Rankine Cycle

When the control unit 500 determines that the waste heat is sufficiently large in a case where an air-conditioning request from a passenger is received, the controlling unit 500 performs the combination operation where both the refrigeration cycle 200 and the Rankine cycle 300 are simultaneously, so as to perform both the air-conditioning operation and electrical-power generating operation. In this embodiment, the control unit 500 performs a switching operation between a Rankine cycle continuation control and a Rankine cycle intermittence control in accordance with the load (e.g., cooling load) of the refrigeration cycle 200. Next, the switching operation between the Rankine cycle continuation control and the Rankine cycle intermittence control during the combination operation will be described with reference to FIGS. 3 to 5.

Figure 3:
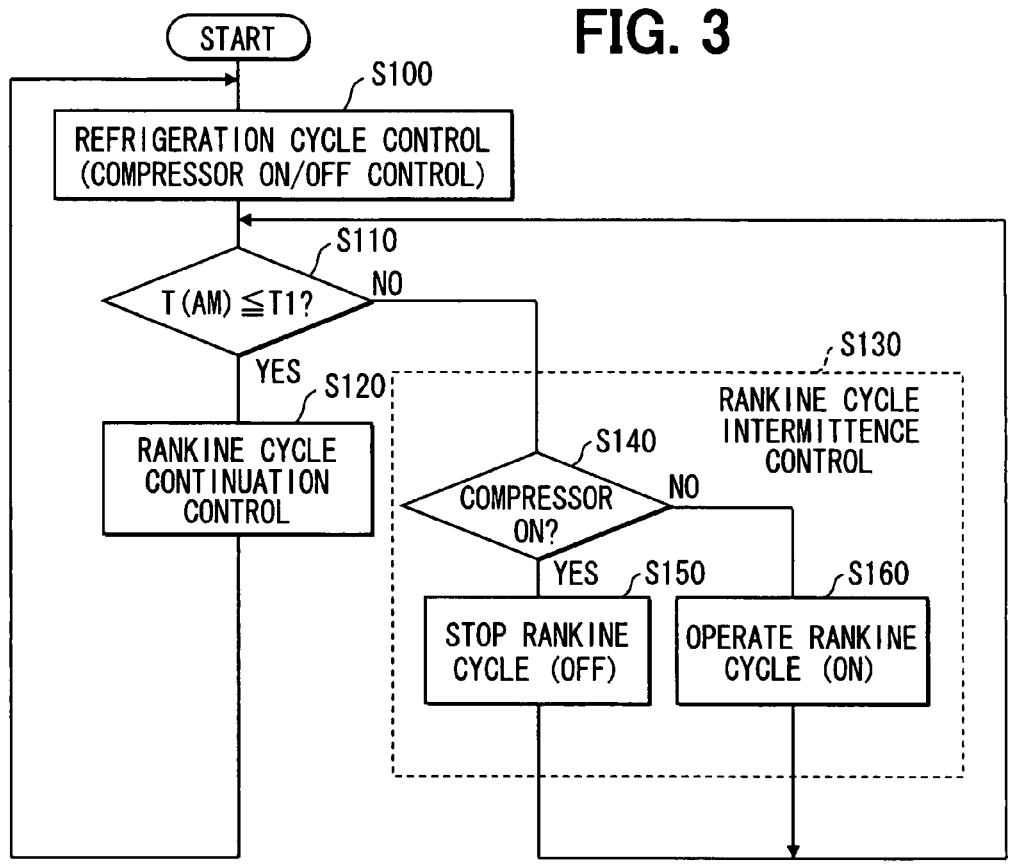
FIG. 3 is a flow diagram showing a control process for performing a combination operation where a refrigeration cycle and a Rankine cycle are simultaneously performed, according to the first embodiment.

First, at step S100 of FIG. 3, the control device 500 performs the control operation of the refrigeration cycle 200 by controlling the ON/OFF operation of the compressor 210, similarly to the single operation of the refrigeration cycle 200. That is, the operation of the compressor 210 is controlled by controlling the ON/OFF operation of the electromagnetic clutch 212, so that the operation of the refrigeration cycle 200 is controlled.

The cooling load of the refrigeration cycle 200 is related to various control conditions, e.g., the set temperature of the passenger compartment, the actual inside temperature of the passenger compartment, the outside air temperature and the solar radiation amount, etc. For example, the cooling load becomes higher, as the actual inside temperature of the passenger compartment, the outside air temperature and the solar radiation amount becomes higher, and as the set temperature of the passenger compartment becomes lower. In this embodiment, the outside air temperature T(AM) detected by the outside air temperature sensor 510 is used for determining the cooling load, as an example. A predetermined cooling load (i.e., predetermined temperature T1) is set, such that a balance (difference) between a recovered energy of the Rankine cycle 300 and a driving energy of the compressor 210 of the refrigeration cycle 200 becomes zero at the predetermined cooling load.

Thus, at step S110, it is determined whether the outside air temperature T(AM) detected by the outside air temperature sensor 510 is equal to or lower than the predetermined temperature T1. When the outside air temperature T(AM) is equal to or lower than the predetermined temperature T1, it is determined that the cooling load is low. In this case, the Rankine cycle continuation operation is performed at step S120 in the combination operation. In contrast, when the outside air temperature T(AM) is higher than the predetermined temperature T1, it is determined that the cooling load is high, and the Rankine cycle intermittence control is performed at step S130 in the combination operation.

Figure 4:
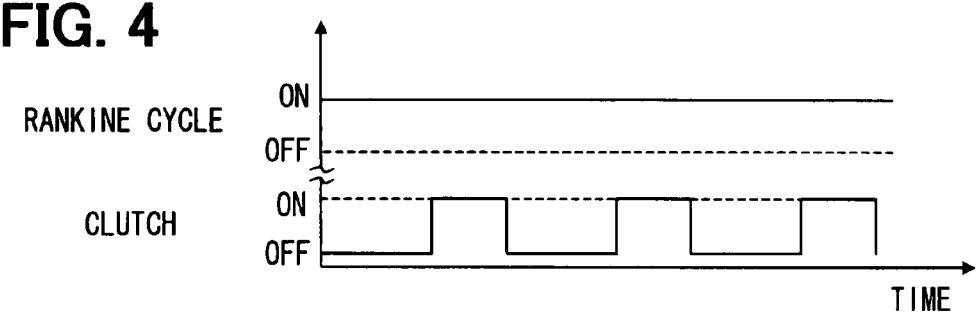
FIG. 4 is a time chard showing a relationship between an operation state of the Rankine cycle and an ON/OFF state of an electromagnetic clutch in a Rankine cycle continuation control of FIG. 3, according to the first embodiment.

In the Rankine cycle continuation control of step S120, the Rankine cycle 300 is continuously operated (ON) regardless of the operation state of the compressor 210 as shown in FIG. 4. That is, in the Rankine cycle continuation control, the electrical motor 331 (electrical pump 330) is operated, the expansion switching valve 322 is opened, refrigerant circulates in the Rankine cycle 200, and the generator 321 generates electrical power.

On the other hand, the Rankine cycle intermittence control of step S130 is performed based on the control process of steps S140 to S160. At step S140, it is determined whether or not the compressor 210 is operated (ON state). When the compressor 210 is operated (ON state) at step S140, the Rankine cycle 300 is stopped at step S150. When the Rankine cycle 300 is stopped, the expansion switching valve 322 is closed, and the electrical motor 331 (pump 330) is stopped. In contrast, when the compressor 210 is stopped (OFF state) at step S140, the Rankine cycle 300 is operated at step S160. When the Rankine cycle operates, the electrical motor 331 (electrical pump 330) is operated, the expansion switching valve 322 is opened, refrigerant circulates in the Rankine cycle, and the generator 321 generates electrical power. After performing step S150 or S160, the control process returns to step S110.

Figure 5:
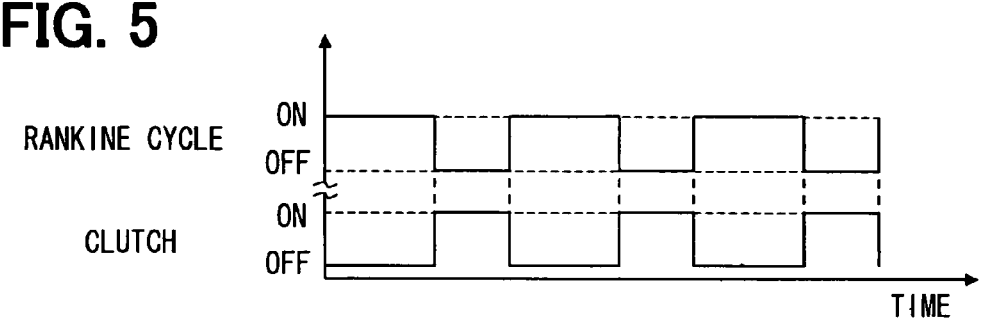
FIG. 5 is a time chard showing a relationship between an ON/OFF state of the Rankine cycle and an ON/OFF state of an electromagnetic clutch in a Rankine cycle intermittence control of FIG. 3, according to the first embodiment.
Figure 6:
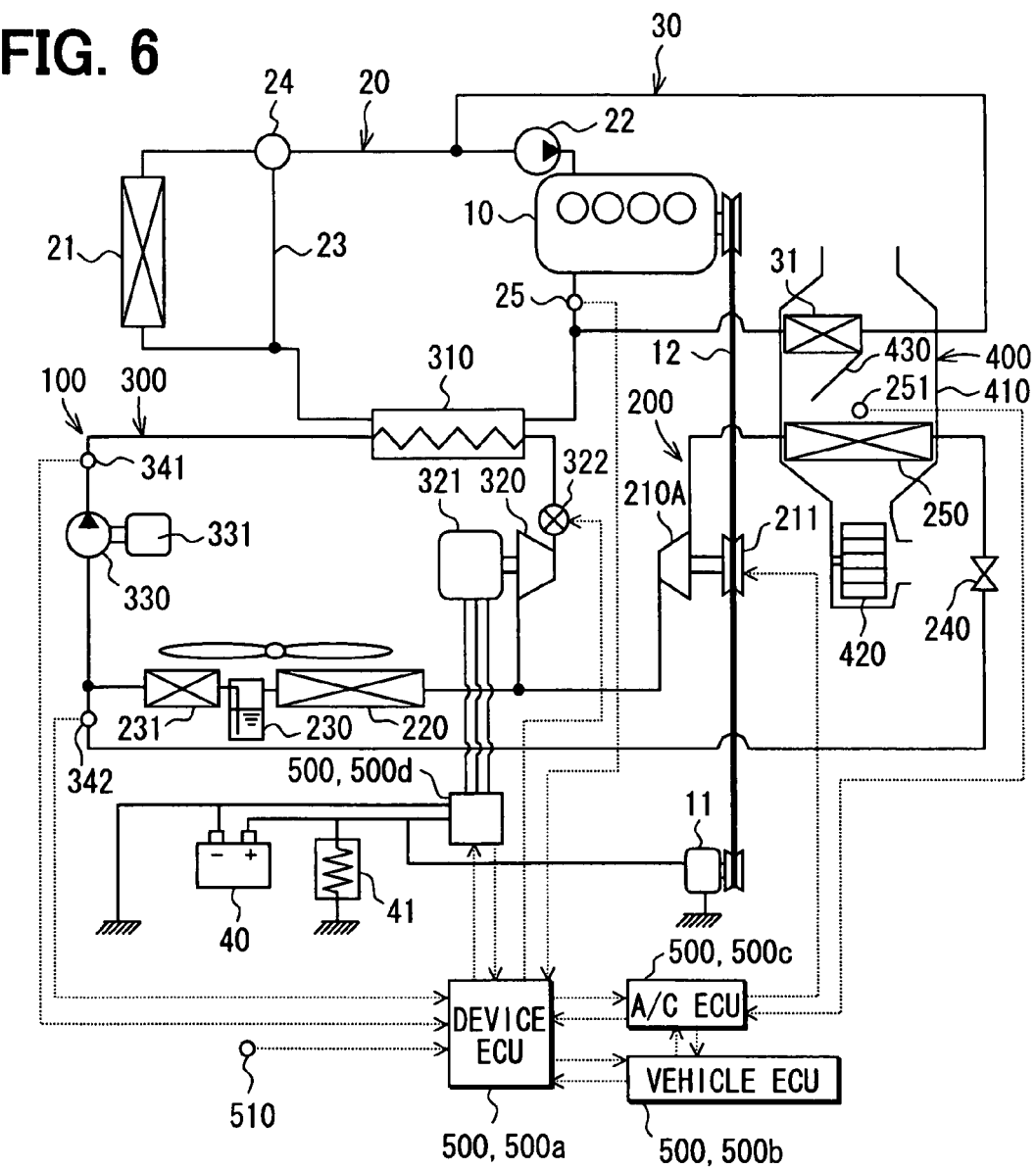
FIG. 6 is a schematic diagram showing a structure of a waste heat utilization device according to a second embodiment of the present invention.

As shown in FIG. 5, in the Rankine cycle intermittence control, the Rankine cycle is switched between the ON state and the OFF state to be reversed with the operation state of the compressor 210 (clutch).

In this embodiment, when the refrigerant pressure detected by the pressure sensor 341 becomes higher than an allowable pressure due to the closing of the expansion switching valve 332 in a case where the Rankine cycle 300 is stopped, the expansion switching valve 322 is opened abnormally in order to protect the Rankine cycle 300 in an emergency state.

According to the first embodiment of the present invention, when the cooling load is lower than the predetermined load during the combination operation of the refrigeration cycle and the Rankine cycle, the electrical energy recovered by the Rankine cycle 300 is larger than the driving energy of the compressor 210. Thus, the energy balance becomes plus, so that the waste heat of the engine 10 can be effectively used by performing the Rankine cycle continuation control, regardless of the operation state of the compressor 210.

When the cooling load is higher than the predetermined load, the Rankine cycle intermittence control is performed. In the Rankine cycle intermittence control, the Rankine cycle 300 is operated when the operation of the compressor 210 is stopped, and is stopped when the compressor 210 is operated. Accordingly, it can prevent the electrical energy recovered by the expansion unit 320 from being lower than the driving energy of the compressor 210. Thus, the energy balance between the electrical energy recovered by the expansion unit 320 and the driving energy of the compressor 210 can be maintained at plus, regardless of the operation state of the compressor 210. As a result, the waste energy of the engine 10 can be effectively used, and fuel consumption efficiency of the engine 10 can be improved.

Because the operation of the compressor 210 is intermittently controlled (ON/OFF controlled), the Rankine cycle intermittence control, where the Rankine cycle 300 is turned ON when the compressor 210 is turned OFF, can be easily set during the combination operation.

Furthermore, according to the first embodiment, the expansion switching valve 322 is provided at the refrigerant inlet side of the expansion unit 320 in the Rankine cycle 300, and expansion switching valve 322 is closed and then the pump 330 is stopped when the Rankine cycle 300 is turned off. Therefore, the Rankine cycle can be accurately rapidly stopped when the compressor 210 is operated in the Rankine cycle intermittence control, during the combination operation where both the refrigeration cycle 200 and the Rankine cycle 300 are simultaneously operated.

Second Embodiment

A second embodiment of the present invention will be now described with reference to FIGS. 6 to 10. In a waste heat utilization device 100 of the second embodiment, a variable displacement compressor 210A is used instead of the fixed displacement compressor 210, as compared with the first embodiment. That is, the variable displacement compressor 210A changes a slant angle of its slant plate so as to adjust its discharge capacity per rotation. Therefore, in the second embodiment, the electromagnetic clutch 212 of the above-described first embodiment is omitted. Thus, a control method for controlling the compressor 210A in the combination operation of the refrigeration cycle 200 and the Rankine cycle 300 is different from that of the above-described first embodiment.

The compressor 210A has a variable discharge capacity that is changeable continuously from 0% to 100% when a maximum discharge capacity to be dischargeable is 100%. When the discharge capacity of the compressor 210A is 0%, the driving power of the engine 10 is not substantially consumed for the compressor 210A, and the compressor 210A substantially does not perform the compression operation even when the compressor 210A is rotated by the engine 10 through the belt 12.

Figure 7:
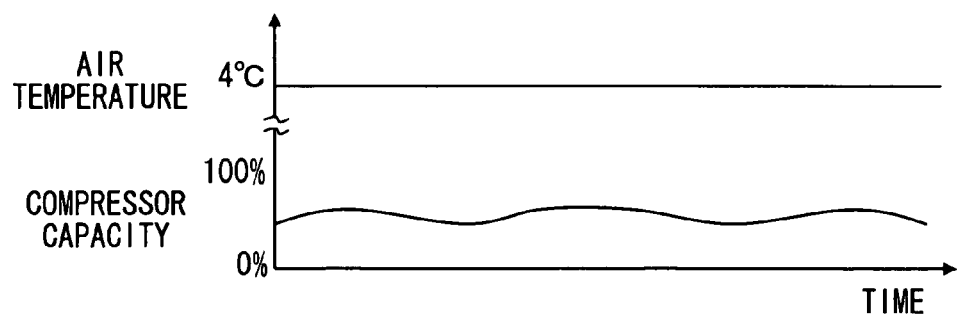
FIG. 7 is a time chard showing a relationship between a compressor discharge capacity and a cooling air temperature in a refrigeration cycle control, according to the second embodiment.

The discharge capacity of the compressor 210A is changed continuously by the air-conditioning ECU 500c of the control unit 500, such that the air temperature cooled by the evaporator 250 becomes a predetermined temperature (e.g., 4° C.), as shown in FIG. 7.

Figure 8:
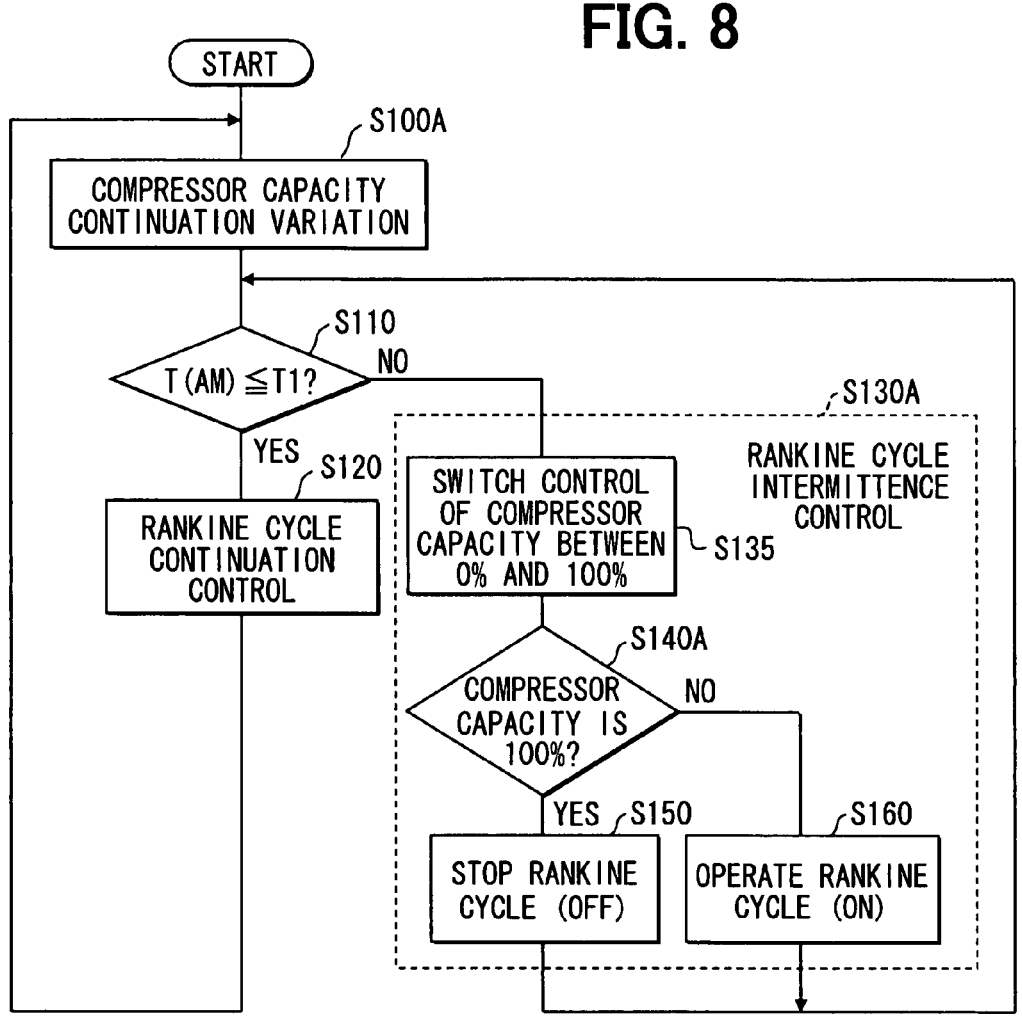
FIG. 8 is a flow diagram showing a control process for performing a combination operation where a refrigeration cycle and a Rankine cycle are simultaneously performed, according to the second embodiment.
Figure 9:
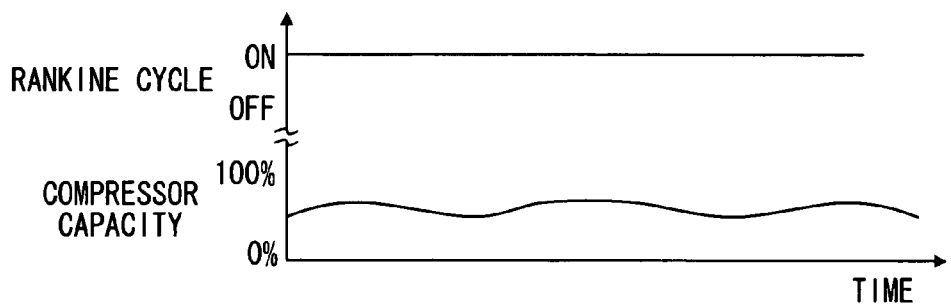
FIG. 9 is a time chard showing a relationship between a compressor discharge capacity and an operation state of the Rankine cycle in a Rankine cycle continuation control of FIG. 8, according to the second embodiment.

The control unit 500 performs the combination operation of the refrigeration cycle 200 and the Rankine cycle 300, as shown in FIG. 8.

First, at step S100A of FIG. 8, the control unit 500 performs the compressor capacity continuation variation in which the discharge capacity of the compressor 210A is continuously changed in accordance with the cooling load in the refrigeration cycle 200. In the operation control of the refrigeration cycle 200, it is determined whether the cooling load is higher than a predetermined load at step S110. Similarly to the first embodiment, the cooling load can be determined based on the outside air temperature (TAM).

When the outside air temperature (TAM) is equal to or lower than a predetermined temperature T1, it is determined that the cooling load is low. In this case, the Rankine cycle continuation operation is performed at step S120. In contrast, when the outside air temperature T(AM) is higher than the predetermined temperature T1, it is determined that the cooling load is high, and the Rankine cycle intermittence control is performed at step S130A.

In the Rankine cycle continuation control of step S120, the Rankine cycle 300 is continuously operated regardless of the operation state of the compressor 210A. That is, in the Rankine cycle continuation control, the electrical motor 331 (electrical pump 330) is operated, the expansion switching valve 322 is opened, refrigerant circulates in the Rankine cycle, and the generator 321 generates electrical power.

Figure 10:
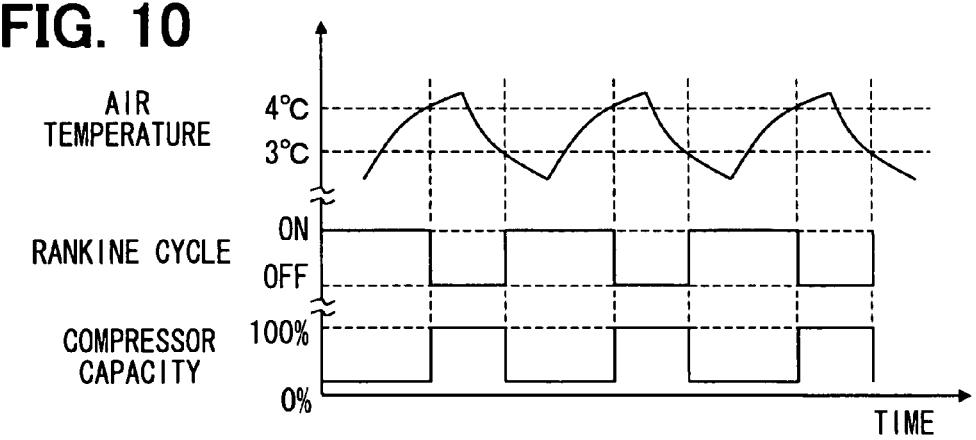
FIG. 10 is a time chard showing a relationship between a compressor discharge capacity, an operation state of the Rankine cycle and a cooling air temperature in a Rankine cycle intermittence control in FIG. 8, according to the second embodiment.

On the other hand, the Rankine cycle intermittence control of step S130A is performed based on the control process of steps S135 to S160. At step S135, a switch control of the compressor capacity is performed instead of the continuation variation control of the compressor capacity at step S100A. As shown in FIG. 10, the discharge capacity of the compressor 210A is alternately switched between a first discharge capacity (e.g., 0%) and a second discharge capacity (e.g., 100%) larger than the first discharge capacity, so that the air temperature cooled by the evaporator 250 approaches a predetermined temperature (e.g., 4° C.). Here, the first discharge capacity is set at a capacity where the driving energy of the compressor 210A is always not larger than the energy recovered by the Rankine cycle 300, for example, the capacity of 0%. In this embodiment, the switch control of the compressor capacity at step S135 is performed using the variable displacement compressor 210A, so that the variable displacement compressor 210A has the same switching function as the fixed displacement compressor 210 in the Rankine cycle intermittence control.

Next, at step S140A, it is determined whether or not the present discharge capacity of the compressor 210A is the second discharge capacity (e.g., 100% in this example). When the present discharge capacity of the compressor 210A is 100%, the Rankine cycle 300 is stopped at step S150. When the Rankine cycle 300 is stopped, the expansion switching valve 322 is closed, and the electrical motor 331 (pump 330) is stopped. In contrast, when the present discharge capacity of the compressor 210A is not 100%, that is, when the present discharge capacity of the compressor 210A is 0%, the Rankine cycle 300 is operated at step S160. When the Rankine cycle 300 operates, the electrical motor 331 (electrical pump 330) is operated, the expansion switching valve 322 is opened, refrigerant circulates in the Rankine cycle 300, and the generator 321 generates electrical power. After performing step S150 or S160, the control process returns to step S110A.

According to the second embodiment of the present invention, the Rankine cycle intermittence control is performed using the variable displacement compressor 210A. That is, by alternately switching the discharge capacity of the variable displacement compressor 210A between the first discharge capacity (0% capacity) and the second discharge capacity (100% capacity), the same effects as those of the first embodiment can be obtained, and the energy balance can be made actually plus. As a result, the waste heat of the engine 10 can be effectively used.

In the second embodiment, at steps S135, S140A, the first discharge capacity of the compressor 210A can be set at a predetermined capacity other than 0% capacity, when the driving energy of the compressor 210A is not larger than the energy recovered in the Rankine cycle 300. For example, the first discharge capacity of the compressor 210A can be set at a capacity close to 0%. Furthermore, the second discharge capacity of the compressor 210A can be set at a predetermined capacity other than 100%, when air temperature cooled by the evaporator 250 can be maintained at a temperature. For example, the second discharge capacity of the compressor 210A can be set at a capacity close to 100%. Because the operation of the Rankine cycle 300 is switched to be reversed in the operation state with the intermittence operation of the compressor 210A, the energy balance can be made plus even when the cooling load of the refrigeration cycle 200 is large.

In the second embodiment, the other parts may be similarly to those of the above-described first embodiment.

Third Embodiment

In the above-described first and second embodiments, the cooling load is determined based on the outside air temperature T(AM). In the third embodiment, the cooling load is determined by combining information used for the control of the engine 10 and information used for the control of the refrigeration cycle 200.

The vehicle speed can be used for the control information of the engine 10. Generally, as the vehicle speed increases, the wind air flowing into the condenser 220 is increased so as to facilitate heat exchange with the refrigerant. Therefore, as the vehicle speed increases, the cooling load of the refrigeration cycle 200 becomes smaller.

Furthermore, as the control information of the refrigeration cycle 200, a solar radiation amount T(S) entering into the passenger compartment, an actual inside temperature T(IN) of the passenger compartment and a set temperature T(SET) can be used in addition to the outside air temperature T(AM). The cooling load is changed in accordance with the solar radiation amount T(S), the actual inside temperature T(IN) and the set temperature T(SET), similarly to that described in the first embodiment. Furthermore, as the refrigerant pressure on the high-pressure side becomes higher, the condensation capacity in the condenser 220 becomes easily in an over-work state, thereby the cooling load becomes higher.

Figure 11:
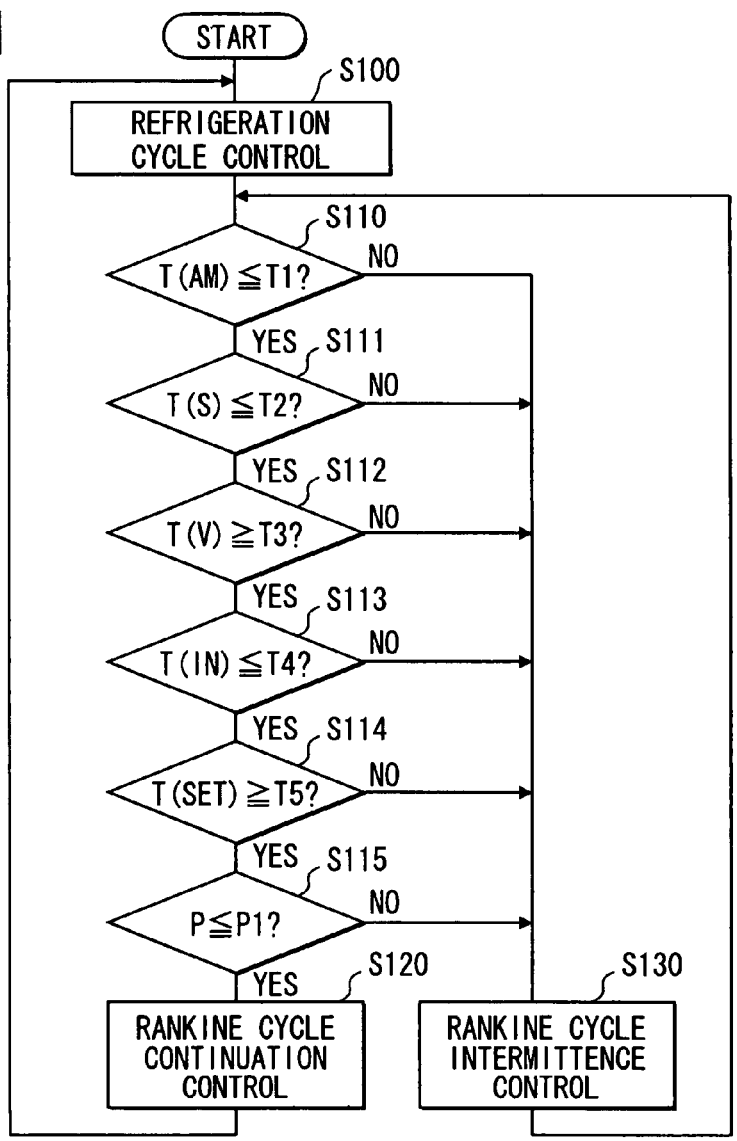
FIG. 11 is a flow diagram showing a control process for performing a combination operation where a refrigeration cycle and a Rankine cycle are simultaneously performed, according to a third embodiment of the present invention.
Figure 12:
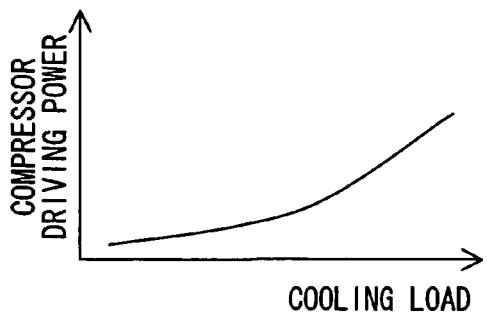
FIG. 12 is a graph showing a relationship between a compressor driving power and a cooling load in a refrigeration cycle, for explaining problems in a related art.
Figure 13:
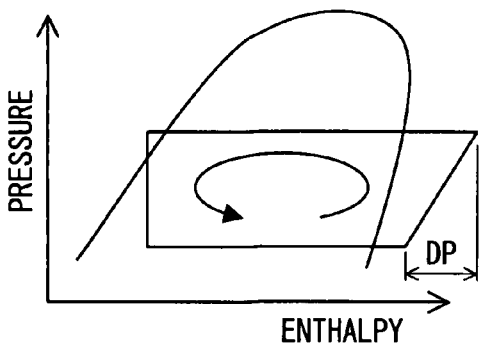
FIG. 13 is a Mollier diagram showing operation of the refrigeration cycle used in FIG. 12.
Figure 14:
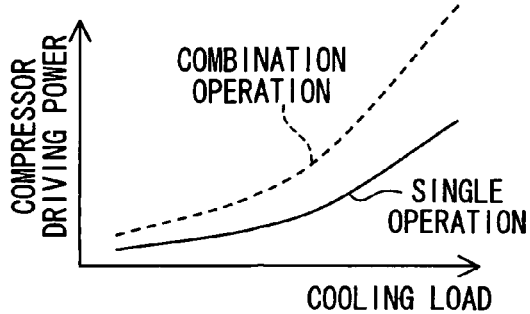
FIG. 14 is a graph showing a relationship between a compressor driving power and a cooling load, for explaining problems in the related art, in a combination operation where the refrigeration cycle and a Rankine cycle are simultaneously operated.
Figure 15:
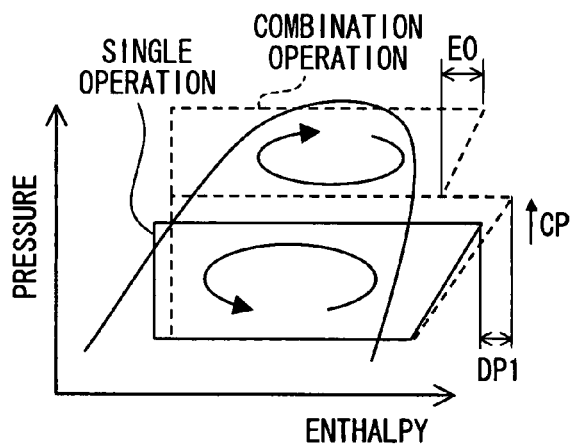
FIG. 15 is a Mollier diagram showing operation states in the combination operation of FIG. 14.
Figure 16:
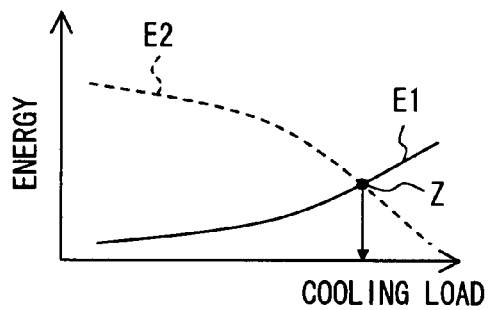
FIG. 16 is a graph showing a relationship between energy E1 for driving a compressor of the refrigeration cycle, energy E2 recovered in the Rankine cycle, and a cooling load in the combination operation of FIG. 15.

FIG. 11 shows a control operation of the control unit 500 in a combination operation in which the refrigeration cycle 200 and the Rankine cycle 300 are simultaneously operated. In FIG. 11, steps S111-S115 are added in the control process of FIG. 3. Therefore, the detail explanation at the same steps as that in FIG. 3 is omitted.

After step S100, the control unit 500 determines whether the outside air temperature T(AM) is equal to lower than a temperature T1 at step S110. When the control unit 500 determines that the outside air temperature T(AM) is equal to or lower than the temperature T1 at step S110, that is, when the cooling load is determined to be low based on the outside air temperature T(AM), steps S111 to S115 are performed. When the determination of any one of steps S110 to S115 is NO, the Rankine cycle intermittence control is performed at step S130. When all determinations of steps S110 to S115 are YES, the Rankine cycle continuation control is performed at step S120.

Specifically, it is determined whether or not the solar radiation amount T(S) is equal to or lower than a temperature T2 at step S111, it is determined whether or not the vehicle speed T(V) is equal to or higher than a value T3 at step S112, it is determined whether or not the inside temperature T(IN) of the passenger compartment is equal to or lower than a temperature T4 at step S113, it is determined whether or not the set temperature T(SET) of the passenger compartment is equal to or higher than a temperature T5 at step S114, and it is determined whether or not the average value of high-pressure side refrigerant pressure P detected by the pressure sensor 342 is equal to or lower than a pressure P1. When all determinations of steps S110 to S115 are YES, it is determined that the cooling load is actually low, and the Rankine cycle continuation control is performed at step S120. When the determination of any one of steps S110 to S115 is NO, it is determined that the cooling load is not low, and the Rankine cycle intermittence control is performed at step S130.

Accordingly, the Rankine cycle intermittence control can be accurately performed in accordance with the cooling load. The above determination of the cooling load can be performed by using any one of the determinations at steps S110 to S115, or by using at least two of the determinations at steps S110 to S115. Alternatively, the cooling load can be determined by using at least one of the engine rotation speed, the water temperature, the engine cooling load, etc, in addition to the above-described information.

Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the expansion switching valve 322 used for stopping the Rankine cycle 300 is located at a refrigerant inlet side of the expansion valve 320. However, the expansion switching valve 322 used for stopping the Rankine cycle 300 may be located at a refrigerant inlet side of the pump 330, or at the other position.

In the above-described embodiments, the power recovered at the expansion unit 320 is used for operating the generator 321 so that the electrical energy is stored in the battery 40. However, the power recovered at the expansion unit 320 can be stored as the dynamic energy due to a flywheel or a mechanical energy such as an elastic energy using a spring.

In the above-described embodiments, the pump 330 is an electrical pump driven by the electrical motor 331. However, the electrical motor 331 may be omitted, and the pump 330 may be connected to an electrical generator 321 having both the motor and generator functions.

The super-cooling unit 231 may be suitably omitted in accordance with a necessary cycle structure in the above-described embodiments.

In the above-described embodiments, the engine (internal combustion engine) 10 is used as a heat generating unit. However, the heat generating unit is not limited to this. Any device, such as an external combustion engine, a fuel cell stack for a fuel cell powered vehicle, vehicle motors, and inverter, which produces heat during operation and wastes a part of heat for a temperature control of the device, can be used as the heat generating unit.

Such changes and modifications are to be understood as being within the scope of the present invention as defined by the appended claims.

What is claimed is:

1. A waste heat utilization device comprising:
a refrigeration cycle having a compressor which draws a low-pressure refrigerant flowing from a side of an evaporator for cooling air, compresses the drawn refrigerant to have a high temperature and high pressure, and discharges the compressed refrigerant toward a condenser in which refrigerant is cooled and condensed;
a Rankine cycle using the condenser in common with the refrigeration cycle, the Rankine cycle including a pump for pumping and sending refrigerant, and an expansion unit which expands refrigerant sent by the pump and heated by waste heat from a heat generating unit so as to recover a mechanical energy; and
a control unit which controls operation of the refrigeration cycle and the Rankine cycle, wherein:
the control unit performs a continuation control of the Rankine cycle, in which the Rankine cycle is continuously operated regardless of an operation state of the compressor, when a load of the refrigeration cycle is lower than a predetermined load; and
the control unit performs an intermittent control of the Rankine cycle, in which the Rankine cycle is intermittently operated in accordance with the operation state of the compressor when the load of the refrigeration cycle is higher than the predetermined load, wherein, in the intermittent control, a quantity of mechanical energy recovered by the expansion unit is larger than a quantity of driving energy required by the compressor for the operation of the Rankine cycle.

2. The waste heat utilization device according to claim 1, wherein:
the control unit performs an intermittent operation of the compressor, in which the compressor is intermittently operated when performing the intermittent control of the Rankine cycle; and
the control unit performs the intermittent control of the Rankine cycle to be reversed in an operation state with the intermittent operation of the compressor.

3. The waste heat utilization device according to claim 2, wherein:
the compressor is a fixed displacement compressor that is driven by a driving source and has a predetermined discharge capacity per rotation; and
the control unit performs the intermittent operation of the compressor by switching a clutch connected with the driving source or turning on or off the driving source.

4. The waste heat utilization device according to claim 2, wherein:
the compressor is a variable displacement compressor with an adjustable discharge capacity per rotation; and
the control unit performs the intermittent operation of the compressor by switching the discharge capacity between a first capacity and a second capacity larger than the first capacity.

5. The waste heat utilization device according to claim 1, wherein:
the Rankine cycle further includes a switching unit for opening and closing a refrigerant path provided therein; and
the control unit controls the switching unit to close the refrigerant path when the operation of the Rankine cycle is stopped during the intermittent control of the Rankine cycle.

6. The waste heat utilization device according to claim 5, wherein: the control unit stops the pump after the switching unit closes the refrigerant path when the operation of the Rankine cycle is stopped during the intermittent control of the Rankine cycle.

7. The waste heat utilization device according to claim 5, wherein: the switching unit is located at a refrigerant inlet side of the expansion unit.

8. The waste heat utilization device according to claim 1, wherein: the control unit determines the load of the refrigeration cycle by using an outside air temperature.

9. The waste heat utilization device according to claim 1, wherein: the control unit determines the load of the refrigeration cycle by combining information for controlling the heat generating unit and information for controlling the refrigeration cycle.

10. The waste heat utilization device according to claim 9, wherein:
the heat generating unit is an internal combustion engine for a vehicle;
the information for controlling the heat generating unit is at least one of a vehicle speed, a rotation speed of the internal combustion engine, an outside air temperature, a coolant temperature of the internal combustion engine.

11. The waste heat utilization device according to claim 9, wherein:
the information for controlling the refrigeration cycle is at least one of an interior temperature of a compartment to be air-conditioned, a target air temperature of air to be blown into the compartment, an air temperature of air cooled by the evaporator, and a refrigerant pressure in the refrigeration cycle.

12. A control method of a waste heat utilization device that comprises: a refrigeration cycle including a compressor which draws a low-pressure refrigerant flowing from a side of an evaporator in which refrigerant is evaporated, compresses the drawn refrigerant to have a high temperature and high pressure, and discharges the compressed refrigerant toward a condenser in which refrigerant is cooled and condensed; and a Rankine cycle which uses the condenser in common with the refrigeration cycle, and includes a pump for pumping and sending refrigerant, and an expansion unit which expands refrigerant sent by the pump and heated by waste heat from a heat generating unit so as to recover a mechanical energy, the control method comprising:

performing a continuation control of the Rankine cycle, in which the Rankine cycle is continuously operated regardless of an operation state of the compressor, when a load of the refrigeration cycle is lower than a predetermined load; and performing an intermittent control of the Rankine cycle, in which the Rankine cycle is intermittently operated in accordance with the operation state of the compressor when the load of the refrigeration cycle is higher than the predetermined load, wherein, in the intermittent control, a quantity of mechanical energy recovered by the expansion unit is larger than a quantity of driving energy required by the compressor for the operation of the Rankine cycle.

13. The control method of the waste heat utilization device according to claim 12, further comprising:

performing an intermittent operation of the compressor, in which the compressor is intermittently operated when the intermittent control of the Rankine cycle is performed; and controlling the intermittent control of the Rankine cycle to be reversed in an operation state with the intermittent operation of the compressor.

14. The control method of the waste heat utilization device according to claim 13, wherein:

the compressor is a fixed displacement compressor that is driven by a driving source and has a predetermined discharge capacity per rotation; and the intermittent operation of the compressor is performed by switching a clutch connected with the driving source or turning on or off the driving source.

15. The control method of the waste heat utilization device according to claim 13, wherein:

the compressor is a variable displacement compressor with an adjustable discharge capacity per rotation; and the intermittent operation of the compressor is performed by switching the discharge capacity between a first capacity and a second capacity larger than the first capacity.

16. The control method of the waste heat utilization device according to claim 12, wherein the Rankine cycle further includes a switching unit for opening and closing a refrigerant path provided therein, the control method further comprising controlling the switching unit to close the refrigerant path when the operation of the Rankine cycle is stopped during the intermittent control of the Rankine cycle.

17. The control method of the waste heat utilization device according to claim 16, further comprising stopping the pump after the switching unit closes the refrigerant path when the operation of the Rankine cycle is stopped during the intermittent control of the Rankine cycle.

18. The control method of the waste heat utilization device according to claim 16, wherein: the switching unit is located at a refrigerant inlet side of the expansion unit.

19. The control method of the waste heat utilization device according to claim 12, further comprising determining the load of the refrigeration cycle by using an outside air temperature.

20. The control method of the waste heat utilization device according to claim 12, further comprising determining the load of the refrigeration cycle by combining information for controlling the heat generating unit and information for controlling the refrigeration cycle.

21. The control method of the waste heat utilization device according to claim 20, wherein:

the heat generating unit is an internal combustion engine for a vehicle;

the information for controlling the heat generating unit is at least one of a vehicle speed, a rotation speed of the internal combustion engine, an outside air temperature, a coolant temperature of the internal combustion engine.

22. The control method of the waste heat utilization device according to claim 20, wherein: the information for controlling the refrigeration cycle is at least one of an interior temperature of a compartment to be air-conditioned, a target air temperature of air to be blown into the compartment, an air temperature of air cooled by the evaporator, and a refrigerant pressure in the refrigeration cycle.

23. The control method of the waste heat utilization device according to claim 12, further comprising determining the load of the refrigeration cycle by using information for controlling the refrigeration cycle, wherein the information includes at least one of an interior temperature of a compartment to be air-conditioned, an outside air temperature, a target air temperature of air to be blown into the compartment, an air temperature of air cooled by the evaporator, and a refrigerant pressure in the refrigeration cycle.

24. The waste heat utilization device according to claim 1, wherein the control unit causes the refrigeration cycle and the Rankine cycle to perform a single operation of the refrigeration cycle, a single operation of the Rankine cycle, and a combination operation of the refrigeration cycle and the Rankine cycle; and the control unit performs the intermittent control of the Rankine cycle in the combination operation of the refrigeration cycle and the Rankine cycle.

25. The control method of the waste heat utilization device according to claim 12, wherein the control unit causes the refrigeration cycle and the Rankine cycle to perform a single operation of the refrigeration cycle, a single operation of the Rankine cycle, and a combination operation of the refrigeration cycle and the Rankine cycle; and the control unit performs the intermittent control of the Rankine cycle in the combination operation of the refrigeration cycle and the Rankine cycle.

26. A waste heat utilization device comprising:

a refrigeration cycle having a compressor which draws a low-pressure refrigerant flowing from a side of an evaporator for cooling air, compresses the drawn refrigerant to have a high temperature and high pressure, and discharges the compressed refrigerant toward a condenser in which refrigerant is cooled and condensed;

a Rankine cycle using the condenser in common with the refrigeration cycle, the Rankine cycle including a pump for pumping and sending refrigerant, and an expansion unit which expands refrigerant sent by the pump and heated by waste heat from a heat generating unit so as to recover a mechanical energy; and a means for controlling operation of the refrigeration cycle and the Rankine cycle to perform a continuation control of the Rankine cycle, in which the Rankine cycle is continuously operated regardless of an operation state of the compressor when a load of the refrigeration cycle is lower than a predetermined load, and to perform an intermittent control of the Rankine cycle, in which the Rankine cycle is intermittently operated in accordance with the operation state of the compressor when the load of the refrigeration cycle is higher than the predetermined load, and in the intermittent control, a quantity of mechanical energy recovered by the expansion unit is larger than a quantity of driving energy required by the compressor for the operation of the Rankine cycle.

* * * * *